United States Patent [19]
Green et al.

[11] Patent Number: 6,003,084
[45] Date of Patent: *Dec. 14, 1999

[54] SECURE NETWORK PROXY FOR CONNECTING ENTITIES

[75] Inventors: Michael W. Green, Shoreview; Ricky Ronald Kruse, Ham Lake, both of Minn.

[73] Assignee: Secure Computing Corporation, Roseville, Minn.

[*] Notice: This patent issued on a continued prosecution application filed under 37 CFR 1.53(d), and is subject to the twenty year patent term provisions of 35 U.S.C. 154(a)(2).

[21] Appl. No.: 08/713,424

[22] Filed: Sep. 13, 1996

[51] Int. Cl.$^6$ ..................................................... G06F 13/00
[52] U.S. Cl. ............................ 709/227; 709/203; 709/230
[58] Field of Search ....................... 395/187.01, 188.01; 709/224, 225, 227, 228, 230, 203, 219

[56] References Cited

U.S. PATENT DOCUMENTS

| | | | |
|---|---|---|---|
| 3,956,615 | 5/1976 | Anderson et al. | 235/61.7 B |
| 4,104,721 | 8/1978 | Markstein et al. | 364/200 |
| 4,177,510 | 12/1979 | Appell et al. | 364/200 |
| 4,442,484 | 4/1984 | Childs, Jr. et al. | 364/200 |
| 4,584,639 | 4/1986 | Hardy | 364/200 |
| 4,621,321 | 11/1986 | Boebert et al. | 364/200 |
| 4,648,031 | 3/1987 | Jenner et al. | 364/200 |
| 4,701,840 | 10/1987 | Boebert et al. | 364/200 |
| 4,713,753 | 12/1987 | Boebert et al. | 364/200 |
| 4,870,571 | 9/1989 | Frink | 364/200 |
| 4,885,789 | 12/1989 | Burger et al. | 380/25 |
| 5,093,914 | 3/1992 | Coplien et al. | 395/700 |
| 5,124,984 | 6/1992 | Engel | 370/230 |
| 5,153,918 | 10/1992 | Tuai | 380/25 |
| 5,204,961 | 4/1993 | Barlow | 395/725 |
| 5,228,083 | 7/1993 | Lozowick et al. | 380/9 |
| 5,263,147 | 11/1993 | Francisco et al. | 395/425 |
| 5,272,754 | 12/1993 | Boebert | 380/25 |

(List continued on next page.)

FOREIGN PATENT DOCUMENTS

| | | |
|---|---|---|
| 0 554 182 A1 | 4/1993 | European Pat. Off. ........ H04L 29/06 |
| 96/13113 | 5/1996 | European Pat. Off. ........ H04L 29/06 |
| 0 743 777 A2 | 11/1996 | European Pat. Off. ........ H04L 29/06 |
| 97/13340 | 4/1997 | European Pat. Off. .......... H04L 9/00 |
| 97/16911 | 5/1997 | European Pat. Off. ........ H04L 29/06 |
| 97/26731 | 7/1997 | European Pat. Off. .......... H04L 9/00 |
| 96/31035 | 10/1996 | WIPO ........................... H04L 12/24 |
| 97/29413 | 8/1997 | WIPO . |

OTHER PUBLICATIONS

"100% of Hackers Failed to Break Into One Internet Site Protected by Sidewinder", News release, Secure Computing Corporation (Feb. 16, 1995).

"Internet Security System Given 'Product of the Year' Award", News Release, Secure Computing Coporation (Mar. 28, 1995).

(List continued on next page.)

*Primary Examiner*—Zarni Maung
*Assistant Examiner*—David M Ovedovitz
*Attorney, Agent, or Firm*—Schwegman, Lundberg, Woessner and Kluth

[57] ABSTRACT

A proxy which is part of a firewall program controls exchanges of information between two application entities. The proxy interrogates attempts to establish a communication session by requesting entities with a server entity in lower layers in accordance with defined authentication procedures. The proxy interfaces with networking software to direct a communication stack to monitor connection requests to any address on specific ports. The requestor's address, and the server's address are checked against an access control list. If either address is invalid, the proxy closes the connection. If both are valid, a new connection is setup such that both the requestor and server are transparently connected to the proxy with variable higher levels being connected in a relay mode. Protocol data units are interrogated for conformance to a protocol session, and optionally further decoded to add additional application specific filtering. In one embodiment, an OSI architecture comprises the levels.

29 Claims, 4 Drawing Sheets

U.S. PATENT DOCUMENTS

| | | | |
|---|---|---|---|
| 5,276,735 | 1/1994 | Boebert et al. | 380/21 |
| 5,303,303 | 4/1994 | White | 380/49 |
| 5,305,385 | 4/1994 | Schanning et al. | 380/49 |
| 5,311,593 | 5/1994 | Carmi | 380/23 |
| 5,329,623 | 7/1994 | Smith et al. | 395/275 |
| 5,333,266 | 7/1994 | Boaz et al. | 395/200 |
| 5,355,474 | 10/1994 | Thuraisngham et al. | 395/600 |
| 5,414,833 | 5/1995 | Hershey et al. | 395/575 |
| 5,416,842 | 5/1995 | Aziz | 380/30 |
| 5,485,460 | 1/1996 | Schrier et al. | 370/94.1 |
| 5,511,122 | 4/1996 | Atkinson | 380/25 |
| 5,530,758 | 6/1996 | Marino, Jr. et al. | 380/49 |
| 5,548,646 | 8/1996 | Aziz et al. | 380/23 |
| 5,550,984 | 8/1996 | Gelb | 395/200.17 |
| 5,566,170 | 10/1996 | Bakke et al. | 370/392 |
| 5,583,940 | 12/1996 | Vidrascu et al. | 380/49 |
| 5,604,490 | 2/1997 | Blakely, III et al. | 340/825.31 |
| 5,606,668 | 2/1997 | Shwed | 395/200.11 |
| 5,608,720 | 3/1997 | Biegel et al. | 370/249 |
| 5,615,340 | 3/1997 | Dai et al. | 395/200.17 |
| 5,619,648 | 4/1997 | Canale et al. | 395/200.01 |
| 5,623,601 | 4/1997 | Vu | 395/187.01 |
| 5,636,371 | 6/1997 | Yu | 395/500 |
| 5,644,571 | 7/1997 | Seaman | 370/401 |
| 5,671,279 | 9/1997 | Elgamal | 380/23 |
| 5,673,322 | 9/1997 | Pepe et al. | 380/49 |
| 5,684,951 | 11/1997 | Goldman et al. | 395/188.01 |
| 5,699,513 | 12/1997 | Feigen et al. | 395/187.01 |
| 5,720,035 | 2/1998 | Allegre et al. | 395/200.06 |
| 5,781,550 | 7/1998 | Templin et al. | 370/401 |

OTHER PUBLICATIONS

"SATAN No Threat to Sidewinder™", News Release Computing Corporation (Apr. 26, 1995).

"Answers to Frequently Asked Questions About Network Security", Secure Computing Corporatin, 41 p. (1994).

Adam, J.A., "Meta–matrices", *IEEE Spectrum*, 26–27 (Oct. 1992).

Adam, J.A., "Playing on the Net", *IEEE Spectrum*, 29 (Oct. 1992).

Ancilotti, P., et al., "Language Features for Access Control", *IEEE Transactions on Software Engineering, SE–9*, 16–25 (Jan. 1983).

Badger, L., et al., "Practical Domain and Type Enforcement for UNIX", *Proceedings of the 1995 IEEE Symposium on Security and Privacy*, Oakland, CA, 66–77 (May 8–10, 1995).

Belkin, N.J., et al., "Information Filtering and Information Retrieval: Two Sides of the Same Coin?", *Communications of the ACM, 35*, 29–38 (dec. 1992).

Bellovin, S.M., et al., "Network Firewalls", *IEEE Communications Magazine, 32*, 50–57 (Sep. 1994).

Bevier, W.R., et al., "Connection Policies and Controlled Interference", *Proceedings of the 8th IEEE Computer Security Foundations Workshop*, Kenmare, County Kerry, Ireland, 167–176 (Jun. 13–15, 1995).

Bowen, T.F., et al., "The Detacycle Architecture", *Communications of the ACM, 35*, 71–81 (Dec. 1992).

Bryan, J., "Furewalls For Sale", *BYTE*, pp. 99–100, 102 and 104 (Apr. 1995).

Damashek, M., "Gauging Similarity with n–Grams: Language–Independent Categorization of Text", *Science, 267*, 843–848 (Feb. 10, 1995).

Dillaway, B.B., et al., "A Practical Design For A Multilevel Secure Database Management System", *American Institute of Aeronautics and Astronautics, Inc.*, 44–57 (Dec. 1986).

Fine, T., et al., "Assuring Distributed Trusted Mach", *Proceedings of the IEEE Computer Society Symposium on research in Security and Privacy*, 206–218 (1993).

Foltz, P.W., et al., "Personalized Information Delivery: An Analysis of Information Filtering Methods", *Communicatioin of the ACM, 35*, 51–60 (Dec. 1992).

Goldberg, D., et al., "Using Collaborative Filtering to Weave an Information Tapestry", *Communications of the ACM, 35*, 61–70 (Dec. 1992).

Grampp, F.T., "UNIX Operating System Security", *AT&T Bell Laboratories Technical Journal, 63*, 1649–1672 (Oct. 1984).

Haigh, J.t., et al., "Extending the Non–Interference Version of MLS for SAT", *Proceedings of the 1986 IEEE Symposium on Security and Privacy*, Oakland, CA, 232–239 (Apr. 7–9, 1986).

Kent, S.T., "Internet Privacy Enhanced Mail", *Communications of the ACM*, 48–60 (Apr. 1993).

Lampson. B.W., "dynamic Protection Structures", *AFIPS Conference Proceedings, vol. 35, 1969 Fall Joint Computer Conference*Las Vegas, NV, 27–38 (Nov. 18–20, 1969).

Lee, K–C., et al., "A Framework for Controlling Cooperative Agents", *Computer*, 8–16 (Jul. 1993).

Loeb, S., "Architecting Personalized Delivery of Multimedia Information", *Communications of the ACM, 35*, 39–50 (Dec. 1992).

Loeb, S., et al., "Information filtering," *Communications of the ACM, 35*, 26–28 (Dec. 1992).

Merenbloom, P., "Network 'Fire Walls' safeguard LAN Data from Outside Intrusion", *Infoworld*, p. 69 (Jul. 25, 1994).

Obraczka, K., et al., "Internet Resource Discovery Services", *Computer, 26*, 8–22 (Sep. 1993).

Press, L., "The Net: Progress and opportunity", *Communications of the ACM, 35*, 21–25 (Dec. 1992.

Schroeder, M.D., et al., "A Hardware Architecture for Implementing Protection Rings", *Communications of the ACM, 15*, 157–170 (Mar. 1972).

Schwartz, M.F., "Internet Resouirces Discovery at the University of Colorado", *Computer, 26*, 25–35 (Sep. 1993).

Smith, R.E., "Sidewinder: Defense in Depth Using Type Enforcement", *Internationa Journal of Network Management*, 219–229, (Jul.–Aug. 1995).

Thomsen, D., "type Enforcement: The New Security Model", *Proceedings of the SPIE, Multimedia: Full–Service Impact on Businnes, Education and the Home*, vol. 2617, Philadelphia, PA, 143–150 (Oct. 23–24 1995).

Warrier, U.S., et al., "a Platform for Heterogeneous Interconnection Network Management", *IEEE Journal on Selected Areas in Communications, 8*, 119–126 (Jan. 1990).

Wolfe, A, "Honeywell Builds Hardware for Computer Security", *Electronics*, 14–15 (Sep. 2, 1985).

Boebert W.E., et al., "Secure Ada Target: Issues, System Design, and Verification", *Proceedings of the Symposium on Security and Privacy*, Oakland, California, pp. 59–66, (1985).

Boebert, W.E., et al., "Secure Computing: The Secure Ada Target Approach", *Sci. Honeyweller*, 6(2), 17 pages, (1985).

International Search Report , PCT Application No. PCT/US 95/12681, 8 p. (mailed Apr. 9, 1996).

"Sidewinder Internals", Product information, Secure Computing Corpopration, 16 (Oct. 1994).

"Special Report: Secure Computing Corporation and Network Security", *Computer Select*, 13 p. (Dec. 1995).

Atkinson, R., "IP Authentication Header", Network Working Group, Request For Comment No. 1826, http//ds.internic/net/rfc/rfc1826.txt, 9 p. (Aug. 1995).

Atkinson, R., "IP Encapsulating Security Payload (ESP)", Network Working Group, Request For Comment No. 1827, hht//ds.internic.net/rfc/rfc1827.txt, 12 p. (Aug. 1995).

Atkinson, R., "Securioty Architecture for the Internet Protocol", Network Working Group, Reqest for Comment No. 1825, http//ds.internic.net/rfc/rfc1825.txt, 21 p. (Aug. 1995).

Baclace, P.E., "Competitive Agents for Information Filtering", *Communications of the ACM*, 35, 50 (Dec. 1992).

Cobb, S., "Establishing Firewall Policy", *IEE*, 198–205 (1996).

Gassman, B., "Internet Security, and Firewalls Protection on the Internet", *IEEE*, 93–107 (1996).

Greenwald, M., et al., "Designing and Academic Firewall: Policy, Practice, and Experience with SURF", *IEEE*, 79–92 (1996).

Karn, p., et al., "The ESP DES–CBC Transform", Network Working Group, Request for Comment No. 1829, http//ds.internic.net/rfc/rfc1829.txt, 9 p. (Aug. 1995).

McCarthy, S.P., "Hey Hackers! Secure Computing Says You Can't Break into This Telnet Site", *Computer Select*, 2 p. (Dec. 1995).

Metzger, P., et al., "IP Authentication using Keyed MD5", Network Group, Request for comments No. 1828, http//ds.internic.net/rfc/rfc1828.txt, 5 p. (Aug. 1995).

Peterson, L.L., et al., In: *Computer Networks*, Morgan Kaufmann Publishers, Inc., San Francisco, CA, pp. 218–221, 284–286 (1986).

Stadnyk, I., et al., "Modeling User's Interests in Information Filters", *Communications of the ACM*, 35, 49–50 (Dec. 1992).

Stempel, S., "IpAcces—An Internet Service Access System for Firewall Installations", *IEEE*, 31–41 (1995).

Stevens, C., "Automating the Creation of Information Filters", *Communications of the ACM*, 35, 48 (Dec. 1992).

White, L.J., et al., "a Firewall Concept for Both Control–Flow and Data–Flow in Regression Integration Testing", *IEEE*, 262–271 (1992).

SECURE NETWORK PROXY FOR CONNECTING ENTITIES

FIELD OF THE INVENTION

The present invention relates to network security systems and in particular to a security system for securely coupling a requester system to a server system.

BACKGROUND OF THE INVENTION

Networks connect many computers together allowing them to exchange data via communications lines. Several standards defining how such data exchanges should occur have been developed and implemented to ensure that computers and computer programs use the same protocols can successfully exchange data. One of the problems associated with the ability to exchange data is ensuring that a requestor entity, such as a user on a network is authorized to access data in a server entity, such as another computer.

Firewalls are devices, such as programs or separate computer systems which were introduced in order to address the security problems associated with connecting a once private network such as a local area network connecting computers in an office, to an "Internet", where the data transmissions are open to eavesdropping, and the potential exists for "hostile" outsiders to disrupt network service or tamper with or attack systems residing on the private network.

There are a number of different classes of firewalls, each designed to address different types of security concerns. In spite of the different approaches, all firewalls perform a function known as "relaying", where Protocol Data Units (PDUs) are received by the firewall from a sending application entity and forwarded to a receiving application entity, possibly with some modifications to the original PDU. Since firewalls are designed to enforce a security policy, some information, or context, must be extracted from the PDUs and subjected to a set of rules. Based on the outcome of the rules check, the firewall performs an action; the PDU is either relayed, modified and relayed, or rejected in some fashion. The precise action is chosen by the designer of the firewall in order to affect the behavior of the system such that the security policy is satisfied. The action is of course subject to the constraints of the protocol the firewall is designed to support.

One suite of protocols used by application entities to exchange data is called Open Systems Interconnect (OSI). OSI Applications are built on the notion of a 7 layer model. Starting at the top, layer 7 is referred to as the application layer, layer 6 is the presentation layer, 5 is session, 4 is transport, 3 is network, 2 is data link and 1 is physical. Starting at the bottom and working up, the physical layer handles the transmission of bits over a communications medium such as a telephone line. The data link layer collects the bits into a group of bits called a frame. The network layer routes the frames between nodes in the network, but calls the frames packets of data. These three lower layers are implemented by communication devices, including switches in the network. The transport layer treats the packets as messages and is the bottom layer in a computer. It interfaces between the internal routing or session layer in the computer and the network. The session layer provides the glue that ties together different data streams, such as the audio and video portions of a teleconferencing application. The next layer up is the presentation layer which deals with the format of data exchanged. Finally, the application layer is the topmost layer and in terms of the Internet, may be thought of as including File Transfer Protocol (FTP) one of the mechanisms used to exchange data in file format on the Internet.

Each layer N provides services to the layer above it (layer N+1) and requires services of the layer below (N−1). Firewalls typically operate as a protocol peer at a particular layer (e.g. the transport layer, N=4), and will forward or relay the protocol information and data (PDUs) at that layer. A layer-4 relay operating over the Internet protocol suite would operate at the Transaction Control Protocol (TCP) protocol layer and forward TCP segments (application data) between communicating application entities, and is considered a protocol peer at the TCP layer.

For applications designed to run on the Internet suite, the application layer is layer 7 when mapped to the OSI model, with layers 5 and 6 being implicitly provided by the TCP. Thus Internet firewalls can perform application specific security checks by simply monitoring the PDUs carried by the transport layer. If a security violation is detected, a meaningful application specific protocol response can be created from context information captured during the session. Internet firewalls respond to security violations by fabricating a response at layer N or N+1, where N is the layer at which the firewall acts as a peer (relay). For example, an FTP firewall acting as a layer-4 relay may reject a connection attempt from an unwanted client by performing a TCP close (layer 4 action), or may reject an attempt to PUT, or store a file by generating a FTP error response (layer 7 action). Note that the layers 5 and 6 actions are implicitly provided by the TCP.

Since Internet application protocols tend to be text based, the data capture and response mechanism can be constructed from relatively simple parsers and encoders, and do not require large amounts of state information to be maintained. Internet firewalls can identify the application context by examining the destination TCP port number that the client Internet application attempts to connect to. An Internet firewalls need not examine any application layer PDUs to determine the type of service being requested. E.g. an Internet firewall can distinguish between a request for Simple Mail Transfer Protocol (SMTP) service for email from that of FTP based on port number only. Thus, an Internet firewall can be configured to allow SMTP but deny FTP simply by accepting requests destined to the SMTP port but denying requests to the FTP port.

For OSI applications, the configuration is more complex. OSI applications are expected to conform strictly to the 7 Layer model (no implicit layers), and make use of the OSI session and presentation layers. Each of these layers introduce extra states into the session, and they operate as protocol entities in their own right. A failure at a higher layer must be conveyed via and onto services provided lower layers.

During a connection establishment phase, the transport layer, session layer, and presentation layer will all attempt to form an association with their corresponding protocol peer, and will negotiate session parameters. The application layer is actually made up of several Application Service Elements (ASEs), each providing support for a different set of related services and protocols, and they can be arranged to form "sub-layers" of the application layer. Common ASEs include the Association Control Service Element (ACSE) and the Remote Operations Service Element (ROSE), and are the core elements found in most OSI applications. ACSE is used to form and tear down associations (connections) and ROSE is used to convey requests and in a uniform fashion. Identifying user credentials and authentication information are exchanged on the protocol chosen (X.500, X.400 or FTAM to name a few), such as the user's Distinguished Name and a password or cryptographic signature. The process of forming an OSI application layer association is known as binding.

Once an application is bound to its protocol peer, the application is said to be in session and processing enters a steady state where application layer PDUs are exchanged and processed until one of the application peers initiates the closing of the session. An orderly release of the association is called unbinding.

All OSI application PDUs are transmitted as binary. Application and presentation layers are typically encoded in a binary format called ASN.1; the session and transport layers fragment the information.

OSI applications are designed to operate in an environment where the OSI Transport layer is employed. A method was developed to map OSI transport services to the Internet stack. This method is described in Internet Request For Comment-RFC-1006 which is stored on many servers on the Internet under a file named rfc1006.txt. In the RFC-1006 method, the OSI Transport Class 0 (TP0) is selected, and TP0 PDUs (T-PDU) are encapsulated with a short four octet header called a T-Packet (TPKT). The RFC suggests that servers which implement this method respond to TCP port 102 which has been reserved for OSI over TCP, but the actual port chosen is left to an administrator or implementor's discretion.

An IP transparent relay would listen on both wires for specific IP data frames to be sent. The IP transparent bridge would contain a list of network addresses associated with each wire so that when one of these frames is received a list is examined and the IP bridge would 'grab' it and put it on the other network. The problem with this simple IP transparent bridge solution is that it can only 'filter' information based on the IP addresses contained within the data. IP address spoofing is very easy, therefore this solution alone is not secure enough for the needs of securing an OSI application.

The transparent relay functionality must be moved up higher again, this time to the OSI Transport layer service. The transport layer over IP is TCP. A TCP transparent relay solution would look for data on specific TCP ports. The TCP bridge would filter based on a specific TCP port which generally maps to a unique application. The problem however, is that the OSI applications are not required to operate on any specific TCP port. Therefore the solution must further examine the data being passed to ensure it matches the content expected of an application communicating through it. But to verify that data, the TCP bridge itself must reply to the connection request. Once the reply is received, the originator would begin sending application data to the TCP bridge. The TCP bridge would then examine the data and decide if it matches the form expected for this application. If it does, the TCP bridge would establish an independent session with the "real" destination device and pass the senders data on to it. Adding this additional processing to accept a connection request and further examine the data takes the functionality beyond a simple transparent bridge. Generally this complete combination of functionality is what is termed a "proxy" solution.

Internet firewalls approach the question of how to securely provide support for OSI protocols using two major approaches, application gateways or proxies. Application gateways are a special form of firewall where the firewall accepts and processes PDUs at the application layer, and appears on the network as a protocol peer to both the client and the server. For OSI protocols, all seven layers are processed by the application gateway, and separate application layer associations are maintained between the firewall and the client, and between the firewall and the server. Thus the firewall is said to be "visible" to the client and the server since it is a directly addressed application entity; the client application thus needs to be aware of how to address the firewall in order to contact the server.

Application gateways are able to glean the full context of the information being processed by virtue of it's operating at the highest layer, giving it a distinct advantage over traditional N-layer proxies (discussed below) when attempting to enforce a protocol specific security policy.

For the Internet applications, application gateways provide the most security, and are feasible to implement due to the simplicity of the protocols. However, OSI protocols are very complex, involving several layers above the TCP layer. Also, since the gateway is a protocol peer, it must support all the necessary protocol elements required to be an actual server for that application.

Because of the complexity of the required service elements and the upper layers of the OSI stack, application layer gateways for OSI services tend to be implementations of the application server themselves sometimes with limited functionality. For example, an application gateway for one communication protocol published by the International Telecommunication Union called X.500 usually takes the form of a X.500 Directory System Agent (DSA), which is the server component of X.500. The DSA is modified to support the security policy decisions in support of the firewall functionality.

While this arrangement offers the potential for very good security, performance is an issue because the firewall must implement or simulate the functionality of the server, often involving complex calculations, data manipulation and a fair amount of saved state information. The firewall may have to buffer large amounts of data before being able to relay the data to the other independent application association. The complexity of this solution also makes it very difficult to prove the correctness of the implementation and to analyze the resulting implementation for security flaws and vulnerabilities.

The second major approach involves filtering N-layer relays (proxies) An N-layer relay acts as a bridge which picks up PDUs sent on one network and retransmits them onto a different network. These devices are called "transparent" because neither end station application entity is aware of the relay.

In order to be termed a proxy, an N-layer relay must perform a firewall function in support of a security policy. Proxies always operate below the application layer, and filter PDUs based on attributes visible at that layer.

If a proxy were to operate at a data link layer, referred to as a MAC layer, it would capture Ethernet frames and examine the addresses in the MAC header, and filter the payload portion (IP datagrams) to determine Internet Protocol (IP) addresses. Higher layer filtering would be infeasible because data would have to be buffered and reassembled in order to gain enough context, and the semantics of TCP are such that only limited number of frames could be buffered and examined before it would become necessary to send them in order to receive more. So if only a partial security context has been determined when the buffer threshold was reached, the data would have to either be discarded or sent without full validation—in either case, an unacceptable alternative for OSI application.

IP layer proxies have essentially the same characteristics as the MAC proxy in terms of policy and limitations. IP proxies gather IP datagrams and can filter on the IP, header, and usually filter on the TCP header as well. IP proxy firewall behavior is available in most modern commercial routers.

TCP proxies can filter on IP addresses, TCP port numbers and other attributes visible at the TCP layer, and relay TCP segments from one network to the other. TCP proxies can be fitted with protocol specific filtering and appear "in-situ", with application data being examined and relayed in real time with only limited buffering, in contrast with the application gateway which would collect a full application context before relaying the data. Most firewalls use the term proxy to refer to a TCP layer relay. A TCP proxy maintains separate TCP connections between the client and the firewall, and between the firewall and the server. In order to satisfy the transparency requirements, a TCP proxy must be capable of accepting a connection attempt from the client on behalf the server.

SUMMARY OF THE INVENTION

Exchange of information between two application entities is securely monitored and controlled by a secure proxy residing on a multilayer communication system. The proxy interrogates attempts by a requestor to establish a communication session with a server using the lower layers and in accordance with defined authentication procedures. The proxy accepts requestor connection requests and establishes an independent connection with the server and relays communications at variable higher layers. In one embodiment, the proxy transparently receives and forwards transport packets in accordance with a defined security policy. In addition, the proxy detects and responds to session failure conditions such as dropped connections. Protocol data units are interrogated for conformance to a protocol session, and optionally further decoded to add additional application specific filtering.

In one embodiment, an N-layer communication system implements the seven layers of Open System Interconnect (OSI) protocols. The proxy comprises a computer program having a connection manager portion and a security manager portion. The proxy interfaces with networking software to direct a communication stack to monitor connection requests to any address on specific ports. The requestor's address, and the server's address are checked against an access control list. If either address is invalid, the proxy closes the connection. If both are valid, a new connection is setup such that both the requestor and server are transparently connected to the proxy. The requester, now expecting to be connected to the server, continues to communicate and tries to establish higher level connections by sending an OSI transport request. The proxy mediates the establishment of the transport connection rather than actively participating. The OSI transport level request contains no security relevant information which the proxy must interrogate, and therefore forwards this request and the corresponding transport reply through. The OSI proxy does, however, gather and record the connection parameters negotiated between the client and the server during this stage.

Next, the proxy enters the session establishment phase by mediating the establishment of the session, presentation, and application connections. The proxy actively interprets the requests for each of the upper layer services as they are conveyed and acknowledged simultaneously. Password, distinguished name and digital signatures are all available to enhance the security provided.

To perform the response, the proxy incorporates features of both application gateways and proxies. In order to effect the desired protocol behavior, the proxy adjusts it's processing to assume the role of a protocol peer at the layer which is appropriate for the response, and the role of either the initiator or responder depending on which side caused the firewall action to be triggered. The proxy in effect operates at layer N, where N is variable as dictated by the security policy and in accordance with required protocol behavior. In addition, the security policy is implemented in the security manager substantially independently from the connection management portion of the proxy.

The present invention provides better performance than application gateways because less processing is required to transfer packets between high levels of the protocols. It is easier to configure and manage than application gateways because it does not need to fully implement the communication protocol being used. In addition, it provides a higher level of security than prior proxies and relays. A further advantage lies in the transparency of the proxy. Since neither the requestor nor server see the proxy, neither needs to be modified to work with the proxy. A further benefit comprises the ability to process or pass through multiple application level protocols, such as X.500 sessions and X.400 sessions with little change in processing.

DESCRIPTION OF THE EMBODIMENTS

Figure 1:
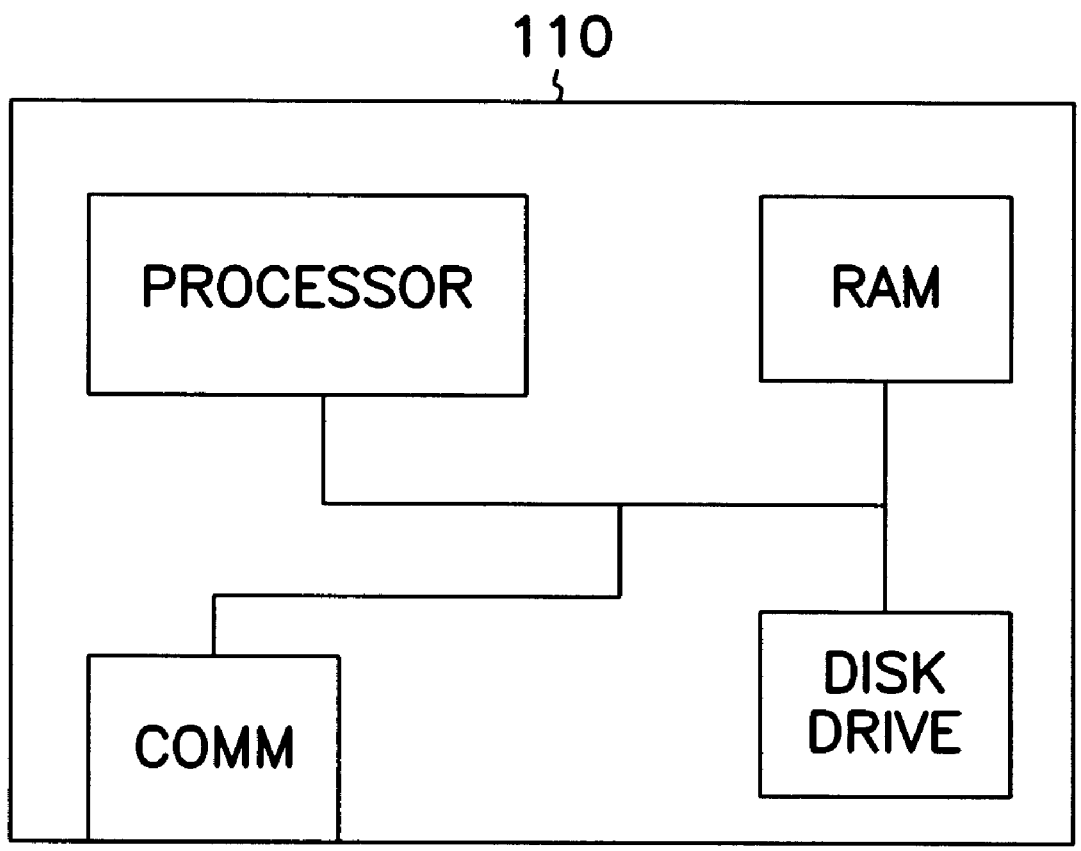
FIG. 1 is a block diagram of a computer system implementing the present invention.

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

There has been an explosion in the growth of computer networks as organizations realize the benefits of networking their personal computers and workstations. Increasingly, these networks are falling prey to malicious outsiders who hack into the network, reading and sometimes destroying sensitive information. Exposure to such attacks has increased as companies connect to outside systems such as the Internet.

To protect themselves from attacks by malicious outsiders, organizations are turning to mechanisms for increasing network security. One such mechanism is described in "SYSTEM AND METHOD FOR PROVIDING SECURE INTERNETWORK SERVICES", U.S. patent application Ser. No. 08/322078 filed Oct. 12, 1994 by Boebert et al., now U.S. Pat. No. 5,864,683, the discussion of which is hereby incorporated by reference. Boebert teaches that modifications can be made to the kernel of an operating system in order to add type enforcement protections. Type enforcement adds an addition level of protection to the process of accessing files. This is quite helpful for the BSD 4.4 UNIX type operating system which, once a process receives privileges, it can use those privileges to access other network files. This can lead to a dangerous breach of network security. Boebert further teaches a computer that is used to connect a private network having a plurality of workstations to a public network. A protocol package such as TCP/IP running on the computer implements a communications protocol used to communicate between each workstation and the computer.

Program code running on the computer is used to communicate through the private network to the workstation's protocol package. In one embodiment, the computer is an Intel Pentium-based machine running a hardened form of BSD386 Unix. A system based on a 90 Mhz Pentium microprocessor with 32 megabytes of memory, 2 gigabytes of hard disk space, a DAT tape for backup and a CD-ROM for software loads has been found to be adequate. Likewise, program code running on the computer is used to communication through a public network interface to a public network such as the Internet. In an Internet embodiment, the program code used to communicate with the Internet is part of a set of Internet protocols which communicate with other computers on the Internet through an Internet connection. In one embodiment, different protocols may be used when communicating with different entities on the Internet. In one embodiment, a TCP wrapper package operating in the Internet protocol is used to sit on the external, public network so that information about external problems can be logged. Such a system is currently being sold under the brand name, Sidewinder, by the assignee hereof. Certain aspects of the Sidewinder product related to burbs and dual stack network separation are further described in "SYSTEM AND METHOD FOR ACHIEVING NETWORK SEPARATION", U.S. patent application Ser. No. 08/599232 filed Feb. 9, 1996, now U.S. Pat. No. 5,918,018, the discussion of which is hereby incorporated by reference.

The current invention is an extension to the Sidewinder product. As shown in FIG. 1 generally at 110, a computer system comprises a processor 112 coupled to a random access memory, RAM 114. While only a single bus 116 is shown connecting the RAM 114 and processor 112 to a communications port 118 and disk drive or other storage medium 120, it will be recognized by those skilled in the art that it represents several different busses in a standard personal computer architecture. The communications port represents various communications options in computer systems, such as ethernet cards, modems and other communication devices.

Figure 2:
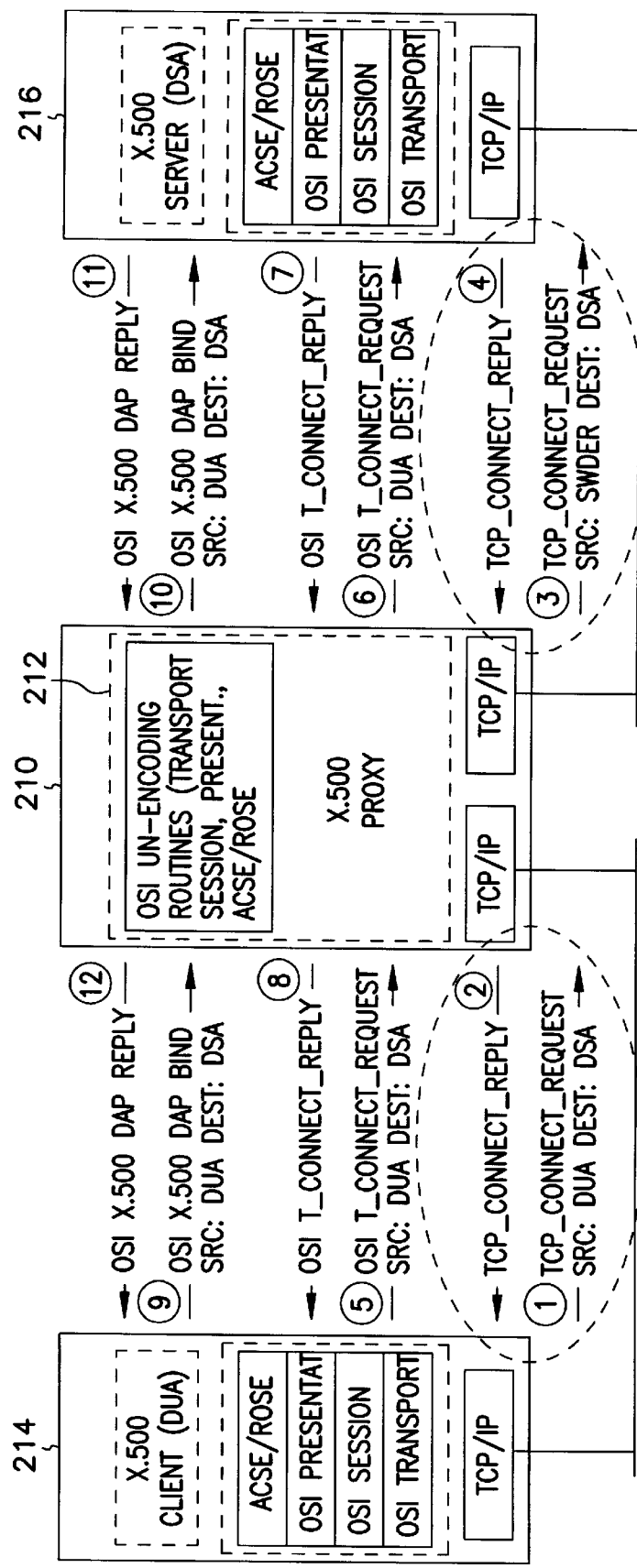
FIG. 2 is a combined block diagram and logical session establishment flow diagram of one embodiment of the present invention.

In FIG. 2, a computer program extension to the Sidewinder product is indicated generally at 210. The computer program is generally stored on the disk drive 120 and run or executed by the processor 112 out of RAM 114. It should be noted that disk drive 120 is used herein to represent various storage medium by which the computer program 210 may be stored and distributed. It also represents a communication medium in which the program may be temporarily stored while being transferred to computer system 110. Computer program 210 further comprises a proxy 212 which is used to process communications complying with different types of OSI application protocols such as the X.500 protocol shown. Also shown in FIG. 2 are a client 214 and server 216 for which connections and data transfers will be described further below.

The Sidewinder security system has special TCP/IP networking modifications which allow it to accept a TCP connection request even though the data was not addressed to it. The Sidewinder can then verify the data and establish another independent session with the real destination device using the destination address specified within the senders original request. This is the method used for implementing the transparent functionality for most of the Sidewinder applications.

Figure 3A:
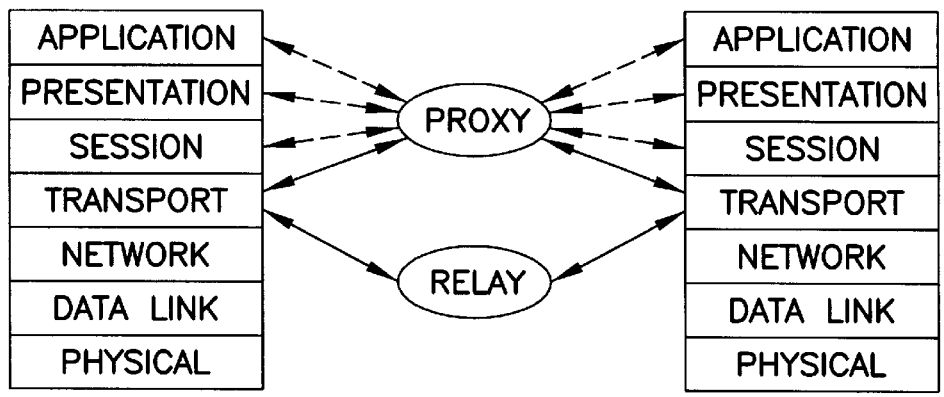
FIG. 3a is a logical block diagram of interaction between components of the embodiment of FIG. 2.

Use of such a TCP proxy would be sufficient to allow two end stations to communicate using OSI applications over TCP/IP. However it would not be very secure. OSI based applications operate using four (4) more layers of OSI protocols as seen in FIG. 3a: transport, session, presentation and application services; and then finally the application data (such as FTAM, X.400, X.500, etc.). As seen in this representation of the computer program, the proxy operates at the top layers of OSI, while the relay transfers transport data at the transport layer.

Figure 3B:
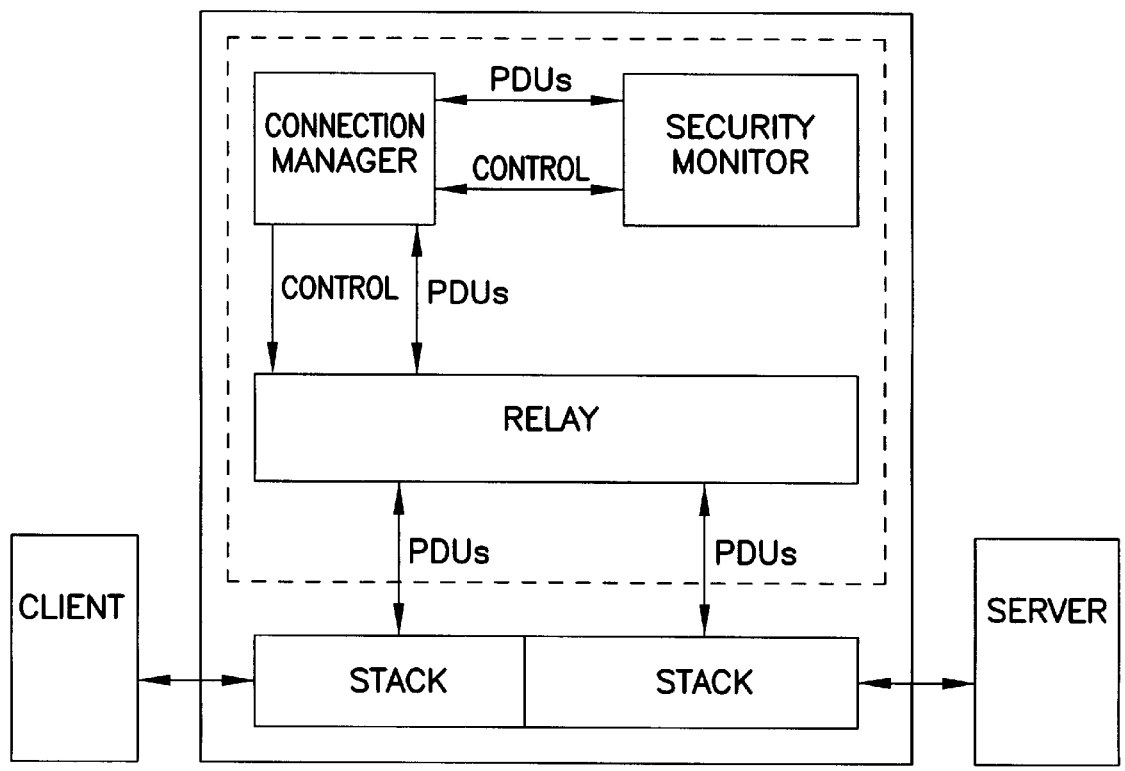
FIG. 3b is a block diagram representing data and control flow between components of the embodiment of FIG. 2.

In FIG. 3b, representations of modules or components of the proxy are shown. A client transfers transport data or PDUs to a TCP stack in the program. The stack passes data on to the relay, which in turn passes it on to a connection manager. The connection manager operates with a security monitor which monitors the data for conformance with predefined conditions described above and further described below. It then provides control information to the connection manager, which in turn controls the relay and directs it whether to establish connections through a second stack to a server.

Because the general public adopted TP0 OSI transport services over TCP/IP, a TSAP may be used. TSAP is the term used to describe the association between a session provider and a particular transport endpoint (similar to the concept of ports in TCP). This is also true for the OSI session (called SSAPs) and the OSI presentation (called PSAPs) services. As in TCP, TSAP, SSAP, and PSAP definitions for specific applications are not directly mapped to any particular application. These are left up to the individual application administrators.

Also, as with TCP, OSI TP0, session, and presentation protocols all use a formal connect/disconnect protocol. However, only in the case of OSI TP0 do the connections have to be established before data may be sent. OSI session and OSI presentation layers allow user data to be included on the actual connection request. This eliminates the need for send connect-request, wait for reply . . . send connect-request, wait for reply . . . at these two layers.

A simple solution would seem to be just building a proxy which verifies that the TCP data contains OSI transport and/or OSI session protocol data. However, herein lies the security problem. This leaves the door open for an end station to communicate through the proxy using any type of OSI application protocol (i.e. FTAM, X.400, X.500, etc.). To rectify this the proxy must check the presentation contexts within the presentation connect_request. The presentation contexts identify the OSI application entities expected to be used during this session. The proxy can then be reasonably assured that this session is to communicate with the application expected.

If the proxy however, is to verify the presentation contexts, then more data must be examined and an exchange of information must occur between the requester and the proxy. Just as was done in TCP, the proxy must reply to the OSI transport connect-request even though it is not addressed to it. This should cause the requesting device to send the session and presentation connect-request frame, which includes identifying the application. The proxy now can verify the presentation contexts and initiate a session with the destination device.

Finally, to complete proxy processing and ensure that only specific OSI application data is being passed though the session, the proxy software continually examines the OSI application level protocols within the data frames. For example, in one embodiment, an X.500 proxy verifies that data exchanged during the session conforms to a specific X.500 protocol. The proxy now meets the requirements described above. The proxy replies to client and server requests to other systems, evaluates the request and then establishes separate connections with the destination system. This all happens transparent to the end stations running application entities since nothing changes in either device. All addresses (IP, OSI TSAP, OSI SSAP, etc.) and software stays the same.

This solution is also very versatile since the proxy is modified to 'pass through' most OSI application level protocols. For example, it processes X.400 sessions (like P7—client to message store) the same way with very little change in processing. Additionally, it allows support of X.500 DISP sessions through the system. This would not be possible with the full DSA application gateway solution.

The X.500 proxy allows any X.500 defined protocols, including Directory Service Protocol (DSP), Directory Access Protocol (DAP), Directory Information System Protocol (DISP), and Directory Operational Binding Management Protocol (DOP), to pass through the Sidewinder between X.500 devices. The X.500 proxy provides one or more of the following functions distributed in the components shown in FIG. 3b:

- interrogate all inbound requests for new X.500 sessions to ensure conformance to configured authentication procedures
- authenticate the signature and X.509 certificates provided on the strong authentication BIND operation for session establishment between devices
- interrogate and filter Protocol Data Units (PDUs) for conformance to OSI protocols
- detect session failure conditions such as dropped connections
- provide filtering function on the session PDUs based on the X.500 operations, attributes, and values Once a connection is established between two devices on different networks, the proxy transparently forwards all X.500 PDUs (requests and their replies) to the two devices. Data items are decoded to check for compliance to the protocol session initiated, however no further interrogation is done during the session. Additional filtering may be performed as desired.

Using this proxy design, neither the client nor the server needs to change any configuration information or software to implement the firewall. That's why this solution is called 'transparent'. In an alternative embodiment, the requester, the server, or both systems mask (hide) their address from each other by addressing the Sidewinder as the server.

There are two major components to the present invention: the proxy communication component which handles the connections between the two devices on each network, and the filtering component. There are three proxy communications component embodiments described:

1: OSI Transport Layer 'transparent bridge' proxy
2: OSI Transport Layer 'transparent bridge' proxy with pre-defined transport layer replies (both positive and negative)
3: OSI Session Layer 'transparent bridge' proxy (this means full Transport layer services)

The transparent bridge proxy operates directly over the TCP/IP protocol stack as seen in FIG. 2. The proxy software interfaces with TCP/IP using the socket library and directs the TCP/IP stack to listen for TCP connection requests to any IP address on specific ports (such as 102, 17003, etc.). Communication steps between the client 214, proxy 212 and server 216 are shown between each block and are numbered in a circle adjacent a description of each step corresponding to the order in which they are controlled by program 210.

The Sidewinder TCP/IP software replies to the connection request and passes the calling information to the proxy. The proxy uses this information to check the requester's IP address (source) and the server's IP address (destination) against an access control list (ACL). If either address is invalid the proxy closes the connection. If both addresses are valid the proxy attempts to setup a new connection with the server on the destination network. The requester is totally unaware this independent connection is taking place. As far as it is concerned, it has already started communications with the destination server. The requester should be in the process of sending an OSI transport (T_CONNECT) request. The proxy verifies this request to ensure that it's a T_CONNECT, and simply forwards it on to the server. The server then sends a T_CONNECT reply which will be verified and forwarded right back at the requester. Next the requester should send one frame with the session connect_request, the presentation connect_request (which includes the application contexts) and the X.500 protocol BIND request.

This X.500 BIND request contains the authentication information the X.500 server needs to identify that this user can access this directory servers database. The X.500 BIND can contain three (3) different forms of authentication: none, simple, and strong. None means the user has not provided any authentication. Simple means the user has identified itself, and provides a clear-text password to the server to verify itself. Strong means there is some form of encrypted password, the X.500 servers name, other authentication info and most likely some form of digital signature. The proxy hands off this BIND PDU to the filter component for verification. The proxy filter component handles all three bind possibilities. The filter maintains a configuration file containing what type of authentication is allowed, who is allowed, and what possible rejection should be returned on error. The filter component then processes the BIND and returns status to the communications component. Based on the status, the proxy may pass the BIND on to the X.500 server, or it may cancel both sessions and close the connections. The status to be returned on error will be configurable.

Because the proxy does not implement OSI transport, session, presentation, ACSE or ROSE layers, it will have to manually build appropriate responses to reject or even possibly abort a connection which may be in place. For example, if the proxy has an established TCP connection and a TP0 connection then receives a presentation P_CONNECT request with an ACSE A-ASSOCIATE request for X.400 presentation context, the proxy must generate a rejection to this request, and close the connections. The proxy could be rude and just close the IP connection, but this is really not appropriate. The requester may just assume a network problem and retry the connection again. The appropriate response would be to build an ACSE A-ASSOCIATE response of "rejected (permanently)". Now because the proxy must generate a reply (not just pass one through from the other side), all the appropriate OSI level responses are added into this PDU. These include the presentation P_CONNECT response with "user-rejection" status, the session level S-CONNECT confirm (reject) "reject by SS-provider" status, and the transport T-DATA confirm. Then the RFC1006 replies are generated and finally given to TCP to transmit. Appropriate timeout values are set in case the connections get lost to clean up. All this is done just to generate the 'correct' reply.

Figure 4:
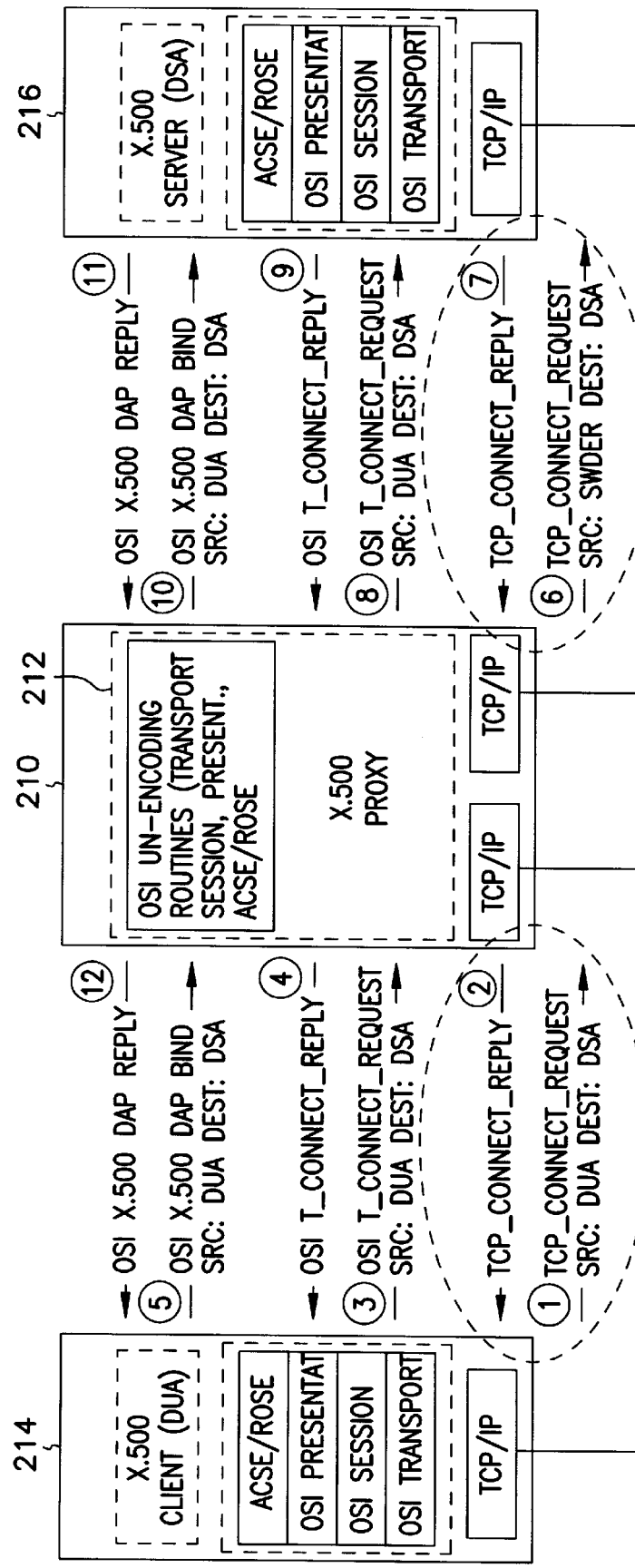
FIG. 4 is a combined block diagram and logical session establishment flow diagram of an alternative embodiment of the present invention.

The second embodiment modifies the operation of the first embodiment of the proxy by providing the ability for the Sidewinder system to directly reply to the requester's TCP/IP session and OSI transport connection requests so as to receive the X.500 communications as shown in FIG. 4. The server next replies to the T-CONNECT request, at which point the proxy sends the BIND (T_DATA and all) as was received from the requester. The server should then process the request and send an appropriate reply back to the Sidewinder system. At this point the Sidewinder system must examine the reply to determine whether the server accepted or denied the BIND request and handle the reply to the client appropriately.

Because this embodiment does not implement a full Transport layer service, simple generic replies are used based on what standard transport layer services provide. For example, current ISODE Consortium products implement Max TSDU sizes of 2041 bytes. The parameters in question are configurable at system installation time with preset values, and allowed to be modified during Sidewinder administration mode. The problem however is that once the Sidewinder proxy has negotiated a size with the requester, the transport parameters will NOT be allowed to be renegotiated on the Sidewinder to server transport connection. If the server does downgrade any of the transport parameters, this connection will have to be aborted and the TCP connection closed because a compatible connection could not be established.

The third embodiment introduces a 'modified' full transport layer service component to operate between the TCP/IP network layer and the proxy software. This phase requires changes to the previous phase's proxy component. The OSI transport services layer is ported, and the proxy modified to use the API available to communicate with the OSI transport layer service (as opposed to the socket API for TCP/IP).

While the present invention has been described with respect to specific embodiments, such as operating in conjunction with the Sidewinder security product, it will be recognized by one skilled in the art that different embodiments will fall within the scope of the claims. Other security products can be utilized with the present invention. In addition, further communication protocols may also be used, and the claims should not be limited to those that have been described.

What is claimed is:

1. A network communication session manager comprising:
   a connection manager that responds to an entity requesting a connection to a remote responding entity by simultaneously establishing a transparent session connection operable at a plurality of distinct protocol layers, between the communication session manager and the requesting entity;
   a security monitor, operatively coupled to the connection manager that monitors communication from the requesting entity for conformance to predefined conditions and wherein the connection manager, responsive to the security monitor establishes an independent connection to the responding entity; and
   a relay, operatively coupled to the connection manager, that relays communication between the requesting entity and the responding entity when both connections are operative, and wherein the relay operates at or below the plurality of distinct protocol layers.

2. The network communication session manager of claim 1 wherein the connection manager responds to the requesting entity and further wherein the security monitor identifies protocol and security violations on a first layer and responds on a plurality of distinct protocol layers.

3. The network communication session manager of claim 2 wherein Open Systems Interconnect (OSI) communication is implemented and wherein the relay operates at an OSI transport layer.

4. The network communication session manager of claim 3 wherein the security monitor monitors protocol information and data (PDUs) at the OSI transport, session, presentation and application layers and the relay relays such PDUs to the responding entity.

5. The network communication session manager of claim 2 wherein the plurality of distinct layers includes a presentation layer, a session layer and a transport layer and wherein the connection manager rejects a remote responding entity by generating a response at the presentation layer, the session layer, and the transport layer.

6. The network communication session manager of claim 2 wherein the plurality of distinct layers includes a presentation layer, a session layer and a transport layer and wherein the connection manager rejects a remote responding entity by generating a presentation layer P_CONNECT response, a session layer S-CONNECT response, and a transport layer T-DATA response.

7. The network communication session manager of claim 1 and further comprising a connection monitor that monitors connection time and detects and responds to session failure conditions.

8. The network communication session manager of claim 1 wherein the communication session manager acts as an RFC-1006 proxy for Open System Interconnect (OSI) application which employ Association Control Service Elements (ACSE) and Remote Operations Service Elements (ROSE).

9. A network communication session manager comprising:
   a connection manager that responds to a requesting entity for a connection to a remote device and transparently, and sinultaneously, establishes an independent connection operable at a plurality of distant protocol layers, between the network communication session manager and the remote device;
   a security monitor, operatively coupled to the connection manager that monitors and selectively modifies data communicated from the requesting entity for conformance to supported protocol standards and adherence to a defined security policy; and
   a relay, operatively coupled to the connection manger, that relays communication between the requesting entity and the remote device when both connections are operative, wherein the relay operates under the control of the security monitor, and further wherein the relay operates at or below the plurality of distinct protocol layers.

10. A method of ensuring secure communications between a requesting application entity and a serving application entity by use of a proxy therebetween, comprising:
   responding to an entity requesting a connection to the serving application entity;
   establishing a transparent session connection operable at a plurality of layers, between the proxy and the requesting entity;
   monitoring, at a plurality of distinct layer, communication from the requesting entity for conformance to a selected communication protocol; and relaying communication between the requesting entity and the serving entity responsive to the conformance to the selected communication protocol, and further wherein the relay operates at or below the plurality of distinct layers.

11. The method of claim 10 and further comprising:

checking an address of the requesting entity against a list of authorized addresses; and modifying the response to the requesting entity based on the check.

12. The method of claim 11 wherein checking, modifying and responding are performed at any of a plurality of layers of a communication protocol, and wherein relaying is performed at different layers of the communication protocol.

13. The method of claim 10 wherein monitoring communication from the requesting entity for conformance to a selected communication protocol includes monitoring for conformance to Open Systems Interconnect (OSI) communication protocol.

14. The method of claim 13 wherein monitoring includes monitoring at an OSI transport layer.

15. The method of claim 10 and further comprising monitoring connection time and responding to session failure conditions.

16. A storage medium having a computer program stored thereon for causing a suitably programmed system to ensure communications between a requesting application entity and a serving application entity, by performing the following steps when such program is executed on the system:

responding to an entity requesting a connection to the serving application entity;

establishing a transparent session connection operable at a plurality of layers, between the system and the requesting entity;

monitoring, at a plurality of distinct protocol layers, communication from the requesting entity for conformance to a selected communication protocol; and relaying communication between the requesting entity and the serving entity responsive to the conformance to the selected communication protocol, and further wherein the relay operates at or below the plurality of distinct protocol layers.

17. The storage medium of claim 16 and further comprising programming for causing the system to perform the steps of:

checking an address of the requesting entity against a list of authorized addresses; and modifying the response to the requesting entity based on the check.

18. The storage medium of claim 17 wherein programming causes the system to perform checking, modifying and responding for any of a plurality of layers of a communication protocol, and wherein relaying is performed at different layers of the communication protocol.

19. The storage medium of claim 16 wherein monitoring communication from the requesting entity for conformance to a selected communication protocol includes monitoring for conformance to Open Systems Interconnect (OSI) communication protocol.

20. The storage medium of claim 19 wherein monitoring includes monitoring at an OSI transport layer.

21. The storage medium of claim 16 and further comprising programming for monitoring connection time and responding to session failure conditions.

22. A network communication controller, comprising:

a processor;

a memory coupled to the processor;

a communications device operatively coupled to the processor and to the memory, wherein the communications device provides any of a plurality of communication connections; and a firewall module operatively coupled to the processor that implements with the processor a communications protocol that controls communication at a plurality of distinct protocol layers, between a requestor and a server via the communications device, wherein the firewall module further comprises:

a connection manger that responds to the requestor requesting a connection to the server and establishes a transparent session connection between the communication controller and the requestor;

an interrogator, operatively coupled to the connection manager that monitors communication from the requestor for conformance to a selected communication protocol; and a relay, operatively coupled to the connection manager and to the server, that relays communication between the requestor and the server under the control of the connection manager and further wherein the relay operates at or below the plurality of distinct protocol layers.

23. The network communication controller of claim 22 wherein the communication protocol is a dual stack communication protocol which places communication between the processor and the server and the processor and the requestor in first and second burbs respectively.

24. The network communication controller of claim 23 wherein the communication controller is operative in a multilayer communication system and wherein the connection manager responds to the requestor and further wherein the security monitor identifies protocol and security violations on a first layer and responds on a plurality of distinct protocol layers.

25. The communication controller of claim 24 wherein the communication system is Open Systems Interconnect (OSI) communication architecture and wherein the relay operates at an OSI transport layer.

26. The communication controller of claim 25 wherein the interrogator monitors protocol information and data (PDUs) at an OSI transport layer and the relay relays such PDUs to the server.

27. The communication controller of claim 22 wherein the connection manager establishes a session connection between the communication controller and the requestor, and also established a session connection between the communication controller and the server.

28. The communication controller of claim 27 and wherein the firewall module further comprises a connection monitor that monitors connection time and detects and responds to session failure conditions.

29. The communication controller of claim 22 wherein the communication controller acts as an RFC-1006 proxy for Open System Interconnect (OSI) applications which employ Association Control Service Elements (ACSE) and Remote Operations Service Elements (ROSE).

* * * * *

UNITED STATES PATENT AND TRADEMARK OFFICE
CERTIFICATE OF CORRECTION

PATENT NO. : 6,003,084
DATED: Dec. 14, 1999
INVENTOR(S) : Micheal W. Green et al.

It is certified that error appears in the above-identified patent and that said Letters Patent is hereby corrected as shown below:

In column 12, lines 33-34, delete "application" and insert --applications--, therefore.
In column 12, line 40, delete "sinultaneously" and insert --simultaneously--, therefore.
In column 12, line 41, delete "distant" and insert --distinct--, therefore.
In column 12, line 50, delete "manger" and insert --manager--, therefore.
In column 12, line 65, delete "layer" and insert --layers--, therefore.
In column 13, lines 3-5, delete "protocol, and further wherein the relay operates at or below the plurality of distinct layers." and insert --protocol.--, therefore.
In column 13, line 12, delete "responsing" and insert-- responding--.
In column 13, lines 41-43, delete "protocol, and further wherein the relay operates at or below the plurality of distinct protocol layers" and insert --protocol.--, therefore.
In column 14, line 15, delete "manger" and insert --manager--, therefore.
In column 14, lines 27-29, delete "manager, and further wherein the relay operates at or below the plurality of distinct protocol layers" and insert --manager.--, therefore.
In column 14, line 54, delete "established" and insert --establishes--, therefore.
In column 4, line 39, delete "(proxies) An" and insert --(proxies). An--, therefore.
In column 6, line 42, delete "illustration specific" and insert --illustration, specific--, therefore.

Signed and Sealed this

Second Day of January, 2001

Attest:

Q. TODD DICKINSON

*Attesting Officer*

*Commissioner of Patents and Trademarks*